W. I. WHEELER.
TRANSMISSION MECHANISM FOR AUTOMOBILES.
APPLICATION FILED APR. 28, 1919.

1,374,265.

Patented Apr. 12, 1921.
3 SHEETS—SHEET 1.

Inventor
William I. Wheeler

By Watson E. Coleman
Attorney

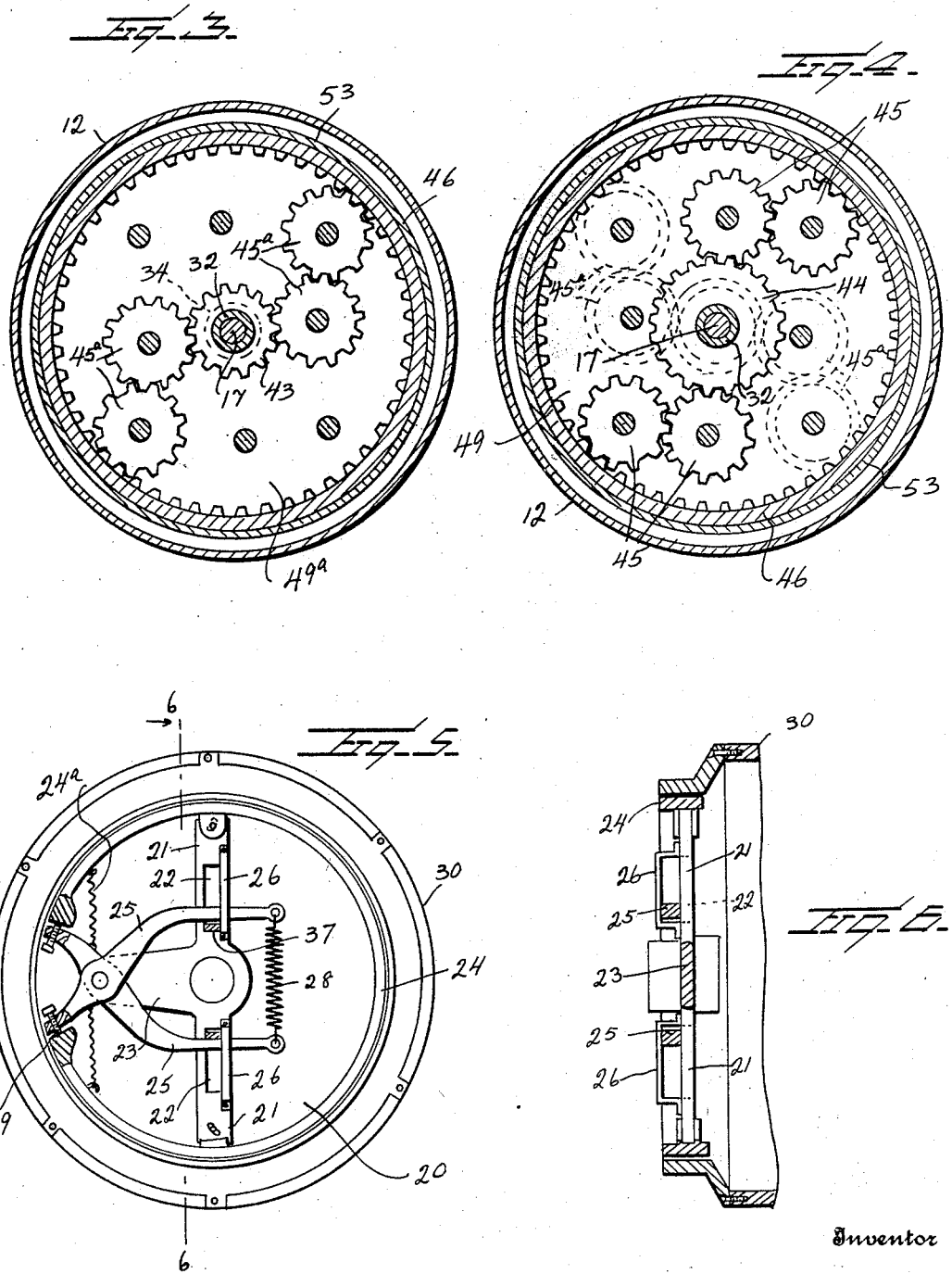

W. I. WHEELER.
TRANSMISSION MECHANISM FOR AUTOMOBILES.
APPLICATION FILED APR. 28, 1919.
1,374,265.
Patented Apr. 12, 1921.
3 SHEETS—SHEET 3.
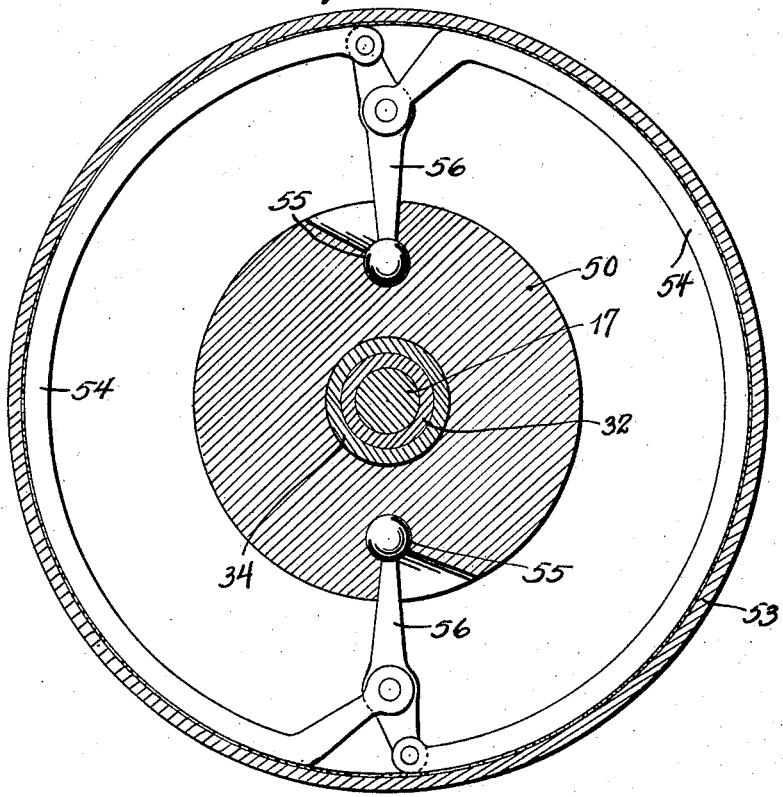
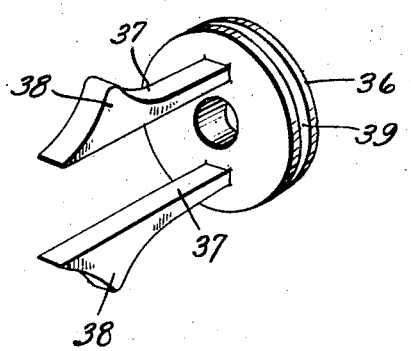
Inventor
William I. Wheeler
By Watson E. Coleman
Attorney

UNITED STATES PATENT OFFICE.

WILLIAM I. WHEELER, OF SCOTTVILLE, ILLINOIS.

TRANSMISSION MECHANISM FOR AUTOMOBILES.

1,374,265.  Specification of Letters Patent.  Patented Apr. 12, 1921.

Application filed April 28, 1919. Serial No. 293,200.

*To all whom it may concern:*

Be it known that I, WILLIAM I. WHEELER, a citizen of the United States, residing at Scottville, in the county of Macoupin and State of Illinois, have invented certain new and useful Improvements in Transmission Mechanisms for Automobiles, of which the following is a specification, reference being had to the accompanying drawings.

This invention relates to transmission mechanism such as is used on automobiles for the purpose of transmitting power from the driving shaft of the engine to the driven shaft thereof.

The general object is to provide a transmission mechanism whereby various speeds of the driven shaft may be secured without the necessity of shifting the gears.

A further object is to provide a very simple and easily operated mechanism of this character in which the changes of speed are secured by means of expansible clutches and a shiftable element which successively, as it is shifted, engages the clutches so as to secure the different speeds.

A further object is to materially improve and simplify speed changing mechanisms of motor vehicles, which is relatively simple in structure, positive and reliable in its operation, and which is capable of manufacture and installation in the power systems of the ordinary motor vehicle at relatively small cost.

Other objects will appear in the course of the following description.

My invention is illustrated in the accompanying drawings, wherein:—

Fig. 3 is a section on the line 3—3 of Fig. 2;

Fig. 4 is a section on the line 4—4 of Fig. 2;

Fig. 5 is an end view of the clutch mechanism shown in Fig. 6;

Fig. 6 is a section on the line 6—6 of Fig. 5;

Fig. 7 is a section on the line 7—7 of Fig. 1;

Fig. 8 is a perspective view of the clutch actuator, and

Figure 1:
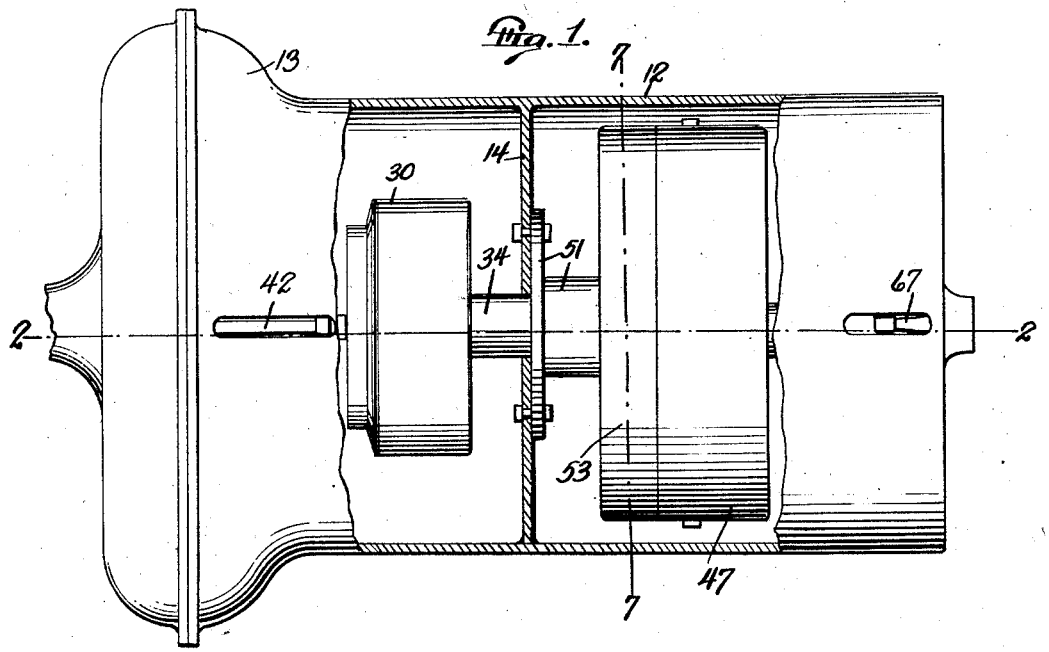
Figure 1 is a top plan view of the housing inclosing my transmission mechanism, the housing being broken away.

Referring to these drawings, 10 designates a driving shaft of a motor vehicle, for instance, which is, of course, mounted in suitable bearings and is driven by the engine of the vehicle and carries upon it the fly wheel 11, this fly wheel being disposed within an elongated, cylindrical housing 12 which, at its forward end, is enlarged, as at 13, to accommodate the fly wheel. This housing is formed with an intermediate web 14 and is closed at one end, as at 15. The shaft 10 at its rear end is reduced, as at 16, and extending in alinement with the shaft 10 is a shaft section 17 which has a socket at its forward extremity to receive the reduced portion 16 of the shaft 10 and which, at its opposite end, is supported in a bearing formed by the web 18 of the housing, and is formed with a socket for engagement with an aligned driven shaft 19 which passes through a bearing in the outer wall 15 of the housing. It will thus be seen that these shaft sections 10, 17, and 19 are independent of each other, that is may have independent rotation.

Mounted upon the shaft 10 are a plurality of rotatable members having radiating arms, these rotatable members being designated 20, 20$^a$, and 20$^b$. Each one of these rotatable members has the oppositely disposed, radially extending arms 21, (see Fig. 5) each of these arms being longitudinally slotted, as at 22, and each rotatable member has an outstanding bracket 23. Extending concentrically to each of the rotatable members 20, 20$^a$, and 20$^b$ is a band 24, this band having the form of a split ring and being resilient and having sliding engagement with the arms 21 so that the band may expand or contract. Pivotally mounted upon the bracket 23 of each of the members 20, 20$^a$, or 20$^b$ are the crossed levers 25, the long ends of which extend across the arms 21 and intersect the slots 22, but are held in place against the arms by straps 26. The levers are pivoted by means of a pivot pin 27 to the bracket 23 and the short arms of the crossed levers are operatively engaged with the ends of the band 24. Thus, when the long arms of the levers are drawn toward each other, the short arms of the levers will also be carried toward each other and the band 24 will be contracted, by spring 24ª while when the long arms of the levers are forced away from each other, the band will be expanded. The long arms are drawn toward each other by means of the spring 28. An adjusting bolt 29 may be disposed upon one or both short arms of the levers 25 to thus allow adjustments of the band to be made to take up wear. These bands 24 of the several members 20, 20ª, and 20ᵇ constitute friction clutch members coacting with complementary friction clutch members, three in number, designated 30, 30ª, and 30ᵇ, and coacting with the clutch members 20, 20ª, and 20ᵇ. The clutch member 30ᵇ is connected to a disk 31 which is attached to and rotates with the shaft section 17. Surrounding the shaft section 17 is a sleeve 32, to which a disk 33 is connected, which disk is longitudinally extended over and concentrically to the clutch member 30ᵇ and supports the clutch member 30ª. Surrounding the sleeve 32, which constitutes a tubular shaft, is a sleeve 34 which also constitutes a tubular shaft and which is provided with a disk 35 having a flange at its periphery which incloses and is concentric to the clutch member 30ª and its supporting flange, and which carries the clutch member 30.

Thus, there are three driving clutch members 20, 20ª, and 20ᵇ and three driven clutch members 30, 30ª and 30ᵇ. These clutch members 20, 20ª, and 20ᵇ are fast upon the shaft 10 to rotate therewith, but when the clutch bands 24 of these members are moved inward or are in contracted position, the coacting clutch members 30, 30ª and 30ᵇ will not move at all, but if one of these bands 24 is forced out against its coacting clutch member, then that shaft which is connected to this coacting clutch member will be rotated with and by the shaft 10. For the purpose of expanding the bands 24 of the several clutch members 20, 20ª, and 20ᵇ, I provide a slidable clutch actuator, (shown in Fig. 8) designated generally 36, which is mounted upon the shaft 10 to rotate therewith and which is provided with a pair of rearwardly directed arms 37, these arms at their forward ends being formed with an outwardly extending cam-shaped protuberance 38 to provide an inclined cam face on the rear of this protuberant portion or cam, and this actuator is longitudinally shiftable upon the shaft 10 so that the cams 38 may be carried through the several slots 22 and shift the long arms of the levers 25 successively away from each other. Thus, for instance, when the actuator 36 is shifted from its inoperative position to an operative position, it will first shift the levers 25 of the clutch member 20 outward and thus expand the band thereof. A further movement will clutch the cam 38 with the next pair of levers 25, while the pair of levers belonging to the clutch member 20 will be retracted to their initial position, and a still further movement of the actuator will cause the outward movement of the levers forming part of the clutch member 20ᵇ. The actuator 36 may be shifted by any suitable means, but I have shown for this purpose the body of the actuator being formed with a shipper ring groove carrying a shipper ring 39 therein, which is connected to an arm 40 mounted upon a shaft 41 in suitable bearings in the housing, this shaft 41 exteriorly of the housing being formed with an arm 42 adapted to be connected to any suitable power transmitting means such as a rod or a belt, or other suitable mechanism.

It will be, of course, understood that the actuator is to be so mounted upon the shaft 10 that while it may slide longitudinally thereon, the arms 27 are always in alinement with the slots 22 of the several clutch means so as to enter said slots.

Figure 2:
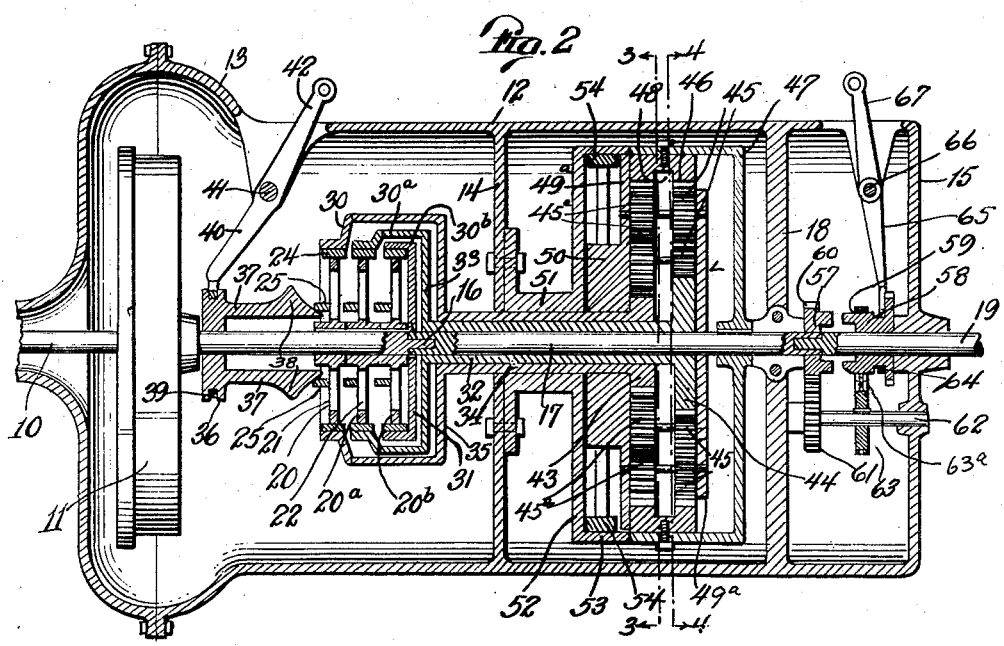
Fig. 2 is a vertical section on the line 2—2 of Fig. 1.

The sleeve 34 carries upon it at its rear end a gear wheel 43 and the sleeve 32 carries upon it the gear wheel 44, larger in diameter than the gear wheel 43. Loosely mounted upon the shaft 17 is the plate 49, and loosely mounted on the tubular shaft 34 is the plate 49ª. These plates are held to each other and braced by a plurality of transversely extending pins, as illustrated in Figs. 2 and 4, upon which are mounted the two pairs of intermeshing pinions 45, the inner pinions of each pair intermeshing with the gear wheel 44, while the outer pinions of each pair mesh with the internal gear wheel 46 carried by a member 47 keyed to the shaft section 17. The gear wheel 43 drives pinions 45ª, which correspond in arrangement and function with pinions 45, the outermost of these pinions 45ª engaging the internal gear wheel 46. The internal gear wheel 46 may be medially grooved, as at 48, if desired. The plate 49 has a longitudinally projecting hub 50 rotatable on the tubular shaft 34.

Also mounted upon this tubular shaft 34 and forming a bearing for this shaft, is a tubular member 51 which is flanged at one end and bolted to the web 14, and at its other end carries a disk 52 angularly flanged at its periphery, as at 53, to form a brake drum. Disposed in connection with this brake drum to coact therewith are expansible brake elements 54. The construction and mounting of these brake elements is illustrated particularly well in Fig. 7, and it will be seen that the hub 50 of the plate or disk 49 is formed at diametrically opposite points with sockets 55. From these sockets extend the links 56, the inner ends of the links being formed, as illustrated in Fig. 7, and the sockets being approximately segmental so that the links as they may be termed will be carried in a radial position when the member 50 rotates in one direction, but it will be automatically shifted to a position inclined to the radial when this member 50 is shifted in the opposite direction.

Each of the links 56 is pivotally connected to the adjacent ends of the friction band sections or brake sections 54 by slitting these band sections at their extremities to embrace the links and disposing pivot pins through the band sections and the links. It will be seen that one end of each band section is pivoted inward of the adjacent end of the other band section and that there is sufficient space between the band sections to permit them to rock. These links 56 act as toggle links so that when the member 50 is rotated in one direction, the band sections 54 will be expanded, and when rotated in the opposite direction they will be contracted. When these sections 54 are expanded, they will bear against the flange 53 and thus hold the plate 49$^a$ from rotation.

The shaft section 17 carries upon its rear end a clutch element 57, and slidingly mounted upon the shaft section 19 is a clutch element 58 carrying a sprocket wheel 59. The clutch element 57 also carries a gear wheel 60 which engages a gear wheel 61 on a countershaft 62, which gear wheel carries a sprocket wheel 63 engaged with the wheel 59. Now when the clutch elements 57 and 58 are disengaged, power from the shaft 17 will be transmitted to the gear wheel 57, thence to the gear wheel 61 to shaft 62, and by pinion 63 through an idler 63$^a$ to sprocket wheel 59, and through the shaft 19, thus rotating the shaft in one direction. If, however, the clutch element 58 is shifted into engagement with the clutch element 56, then the wheel 59 will be disengaged from gear wheel 63 and power will be transmitted directly from shaft 17 to shaft 19 and the speed of the two shafts will be the same. For the purpose of shifting the clutch element 58, I provide a shipper ring 64 mounted upon an arm 65, carried by a shaft 66, carrying in turn an arm 67 upon the exterior of the housing, this arm being connected to any suitable actuating means.

The operation of the mechanism will be readily understood by those cognizant with the art. When the actuating member 36 is in its fully retracted position, all of the expanding clutch members 25 are retracted from engagement with their coacting clutch members 30, 30$^a$, and 30$^b$ and the driving shaft therefor does not transmit power to the driven shaft. When it is desired to run the machine at low speed, the member 36 is shifted so as to spread the arms of the first clutch member 20 and expand the band thereof. At this time, the bands 54 are in engagement with the brake drum formed by the flange 53 and therefore the gear ring 46 may be rotated by the pinions 45$^a$ and thus a relatively slow rotative speed is transmitted to the shaft section 17 through the carrying drum 47 and transmitted through the clutch 58 to the driven shaft 19, or through the gears 56, 61, 63, and 59 to the shaft 19. If it is desired to use the second speed, the member 36 is shifted so that its cam faces will spread apart the arms 25 of the second clutch member 20$^a$, thus clutching the member 20$^a$ to the member 30$^a$ and connecting the driving shaft to the gears 45, driving the shaft section 17 and the shaft 19 in the manner heretofore described. It will be understood, of course, that when the low and second speed gears are acting, the automatic clutch formed of the parts 54, 55, and 56 is in action so that rotation given to the pinions 45 or 45$^a$ will cause a rotation of the ring 46. At other times, the automatic clutch is inoperative and hence the plates 49 and 49$^a$ will rotate freely so that the internal gear wheel 46 may rotate freely without transmitting power back through the gears 45 or 45$^a$ to the clutch members 30 and 30$^a$. When it is desired to drive the shaft 19 directly from the shaft 10 without any reducing gears, then the member 36 is shifted so that its cam 38 engages the arms 25 of the clutch member 20$^b$, thus expanding the band 24 of this clutch member against the clutch member 30$^b$ and transmitting power directly to the shaft 17 and through the shaft 10 to the driven shaft 19 either by means of the clutch members 56 and 58, or the gear wheels 57, 61, 63, and 59, as the case may be.

By the mechanism described, I secure three speeds and a reverse, and the reverse movement of the machine may be made at any of the three speeds. It will be seen that the movements securing these three speeds are successive one to the other and allow a perfectly natural movement of shifting the lever 42 or its allied parts in one direction from low to high and reversely from high to low, thus making the mechanism extremely easy to learn and operate.

Attention is particularly called to the feature of the automatic clutch formed by the parts 54, 55, 56, and 53. This clutch, as illustrated most clearly in Fig. 7 is so constructed that when the plate 49 and the hub 50 are rotated in one direction, the links 56 will contract the bands or members 54, and when there is any tendency to rotate in the opposite directions, these links 56 will expand the bands, locking them against the brake drum formed by the member 53 and preventing any reverse movement which is necessary when the first or second train of gears is employed.

Figure 9:
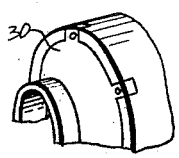
Fig. 9 is a fragmentary perspective of one of the driven clutch members.

As illustrated particularly in Fig. 9, the clutch members 30 and 30$^a$ are formed in two sections, one of these sections being notched and the other being provided with lugs and engaging said notches and held in place by screws or otherwise, thus permitting the parts to be assembled.

The housing or case 12 may be of any desired size and shape and mounted upon the car or connected to the motor in any desired way, and this housing may be filled with oil or grease within which the gearing may run.

While I have illustrated the form of my invention which I believe to be particularly effective, it will be understood that the mechanism illustrated may be modified in many ways and rearranged without departing from the spirit of the invention as defined in the appended claims.

I claim:—

1. A speed changing mechanism including a driving shaft, a driven shaft, a plurality of clutch members mounted upon the driving shaft and including radially disposed arms, clutch members mounted upon said driven shaft corresponding in number and relation to the clutch members of said driving shaft, an expansible and contractible circular band operatively supported on the arms, crossed levers operatively connected to said band, the long arms of said levers extending across the radial arms and being guided thereon, a spring engaging the long arms of the levers and drawing them toward each other to cause a contraction of the band, and an actuating member mounted to rotate with the driving shaft but longitudinally shiftable therealong and having cam faces engaging between the long arms of the levers to thereby expand the band connected thereto and engage any one of the clutch members on the driving shaft with the corresponding clutch member operatively connected to the driving shaft.

2. A speed changing mechanism including a driving shaft, a driven shaft, clutch members mounted upon the driving shaft and including radially slotted arms, a contractible and expansible, circular, split band operatively mounted upon the radial arms, crossed levers pivoted to each other and having their outer ends pivotally connected to the expansible band at the split thereof, the long arms of the levers extending transversely of the radial arms and being guided thereon and intersecting said slots, and an actuating device mounted to rotate with the driving shaft to slide longitudinally thereon and provided with oppositely disposed portions slidable through the slots of the radial arms and having cam faces adapted to engage said levers to spread them apart to thereby expand the band inward of said clutch members into engagement with the coacting clutch member.

3. The combination with a driving shaft and a driven element, of a clutch for operatively engaging or disengaging the driven element from the driving element comprising a member mounted upon the driving element and having radial, slotted arms, an expansible and contractible, circular, split band operatively mounted upon the arms, a pair of crossed levers pivotally mounted upon the clutch element and operatively connected at their outer ends to the ends of the band, the opposite arms of the levers extending across the radial arms and being guided thereon and intersecting the slots thereof, a spring urging said levers toward each other to thereby contract the band, means for contracting said levers away from each other to expand the band comprising a member slidingly mounted upon the driving element and having portions insertible through the slots of the radial arms, said portions being formed with an exteriorly protuberant cam exerting working engagement against said arms as the member is moved horizontally on the driving element in one direction to urge the arms apart and thereby expand the band, and a coacting, annular clutch member operatively connected to the driven element and coacting with said band.

4. A speed changing mechanism including a drive shaft, a driven shaft in alinement with the drive shaft, a plurality of expansible and contractible clutch elements mounted upon the driving shaft in longitudinally spaced relation, a clutch member mounted upon the driven shaft and coacting with one of said expansible and contractible clutch members, a sleeve surrounding the driven shaft and rotatable independently thereof and carrying an annular clutch element coacting with another of said expansible and contractible clutch elements, said sleeve carrying a gear wheel, an internally toothed gear wheel surrounding the driven shaft and operatively connected thereto, and an intermediate train of gears meshing with each other and with the gear wheel on the tubular shaft and with the internally toothed gear wheel to thereby transmit power through the train of gears thus formed to the driven shaft.

5. A speed changing mechanism including a drive shaft, a driven shaft in alinement with the drive shaft, a plurality of expansible and contractible clutch elements mounted upon the driving shaft in longitudinally spaced relation, a clutch member mounted upon the driven shaft and coacting with one of said expansible and contractible clutch members, a sleeve surrounding the driven shaft and rotatable independently thereof and carrying an annular clutch element coacting with another of said expansible and contractible clutch elements, said sleeve carrying a gear wheel, an internally toothed gear wheel surrounding the driven shaft and operatively connected thereto, an intermediate train of gears meshing with each other and with the gear wheel on the tubular shaft and with the internally toothed gear wheel to thereby transmit power through the train of gears thus formed to the driven shaft, a rotatable disk carrying said intermediate gear wheels, and means permitting the rotation of the disk in one direction but locking the disk against rotation in the opposite direction.

6. A speed changing mechanism including a drive shaft, a driven shaft in alinement with the drive shaft, a plurality of expansible and contractible clutch elements mounted upon the driving shaft in longitudinally spaced relation, a clutch member mounted upon the driven shaft and coacting with one of said expansible and contractible clutch members, a sleeve surrounding the driven shaft and rotatable independently thereof and carrying an annular clutch element coacting with another of said expansible and contractible clutch elements, said sleeve carrying a gear wheel, an internally toothed gear wheel surrounding the driven shaft and operatively connected thereto, an intermediate train of gears meshing with each other and with the gear wheel on the tubular shaft and with the internally toothed gear wheel to thereby transmit power through the train of gears thus formed to the driven shaft, a rotatable disk carrying said intermediate gear wheel and having a hub formed with sockets, links disposed in said sockets and normally held in a detachable position but shiftable into a radial position upon a rotation of the disk in one direction, segmental brake bands having their ends pivoted to said links and expanded by the movement of the links from a tangential to a radial position, and a fixed annular brake drum with which segmental brake bands coact.

7. A speed changing mechanism including a driving shaft, a driven shaft formed in two alined sections, said driven shaft being in alinement with the driving shaft, a plurality of expansible and contractible clutch members mounted upon the driving shaft, a corresponding number of clutch members with which said first named clutch members coact, one of said clutch members being mounted upon one of the sections of the driven shaft, tubular concentric shafts to which the other clutch members are connected and having gear wheels at their ends opposite said clutch members, the gear wheels being of different diameters, an internal gear for each of said gear wheels, an annular member to which said internal gears are fixed and connected to the last named section of the driven shaft to rotate therewith, disks carrying the intermediate gears, means automatically locking the disks from rotation in one direction but permitting the rotation of the disks in the other direction, a clutch member mounted upon the first named section of the driven shaft, a coacting sliding clutch member mounted upon the other section of the driven shaft whereby the two sections may be directly connected to each other, a countershaft having gear wheels thereon, one of said gear wheels being operatively driven from the first named section of the driven shaft, and means connecting the second gear wheel with the last named section of the driven shaft when the clutches are out of engagement.

8. A transmission mechanism including alined driving and driven shafts, a plurality of tubular shafts disposed concentric to each other and the driven shaft, each of said tubular shafts carrying a gear wheel at one end, the gear wheels being of different diameters, a plurality of clutch members mounted upon the driving shaft, a plurality of clutch members mounted upon the tubular shafts and coacting with the first named clutch members whereby the driving shaft may be connected to any one of said tubular shafts, an internal gear wheel operatively connected to the driven shaft, a plurality of sets of pinions disposed between and transmitting power from the gear wheels on the tubular shafts to the internal gear wheel, and means for automatically preventing the movement of the pinions around the tubular shafts as a center in one direction, but permitting the free movement of said pinions around the tubular shafts in the opposite direction.

9. A speed changing mechanism including a driving shaft, a driven shaft in axial alinement with the driving shaft, a plurality of clutch elements mounted upon the driving shaft in longitudinally spaced relation, a clutch member mounted upon the driven shaft and coacting with one of said clutch elements, a sleeve surrounding the driven shaft and rotatable independently thereof and carrying a clutch element coacting with another of said first named clutch elements, said sleeve embodying a gear wheel, an internal gear wheel surrounding the driven shaft and secured against rotation with relation thereto, and a gear connecting the gear wheel of said sleeve with said internal gear wheel.

10. A speed change mechanism including a drive shaft, a driven shaft in axial alinement with the drive shaft, a plurality of clutch elements mounted upon the driving shaft in spaced relation, a clutch member mounted upon the driven shaft and coacting with one of said clutch elements, a sleeve surrounding the driven shaft and rotatable independently thereof embodying a clutch member coacting with another of said clutch elements, said sleeve embodying an external gear, an internal gear coplanar with the external gear and secured against rotation with relation to said driven shaft, a gear connecting said external and internal gears, a rotatable element carrying said connecting gear and means for automatically locking said element against rotation in one direction and permitting free rotation thereof in the opposite direction.

In testimony whereof I hereunto affix my signature in the presence of two witnesses.

WILLIAM I. WHEELER.

Witnesses:
 ROBT. L. CLARK,
 CLYDE I. WHEELER.